Figure 1:
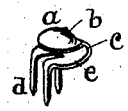

E. MAYNZ.
Lacing-Hook.

No. 198,646.    Patented Dec. 25, 1877.

WITNESSES
F. F. Raymond 2d
A. J. Oettinger

INVENTOR
Edwd Maynz

UNITED STATES PATENT OFFICE.

EDWARD MAYNZ, OF BOSTON, MASSACHUSETTS.

IMPROVEMENT IN LACING-HOOKS.

Specification forming part of Letters Patent No. 198,646, dated December 25, 1877; application filed November 14, 1877.

*To all whom it may concern:*

Be it known that I, EDWARD MAYNZ, of Boston, in the county of Suffolk and State of Massachusetts, have invented an Improvement in Lacing-Hooks, of which the following is a specification:

The nature of my invention is best explained by reference to the drawing, in which—

Figure 2:
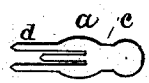
Figure 3:
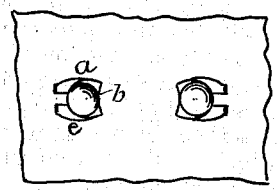
Figure 4:
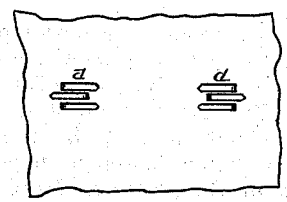

Figure 1 is a perspective view of the completed article. Fig. 2 is a plan of the blank from which the hook is shaped. Fig. 3 is a plan of the hook when fastened in position. Fig. 4 is a plan of the portions of the prongs which are passed through the material to which the hook is attached and clinched on the under surface thereof, and Fig. 5 is a vertical section through the hook and the material upon which it is fastened.

The manipulation employed by me in making the lacing-hook is first to cut a flat blank, shaped as shown in Fig. 2, from a thin sheet of brass, or some other soft-metal composition, and then to shape it by suitable mechanism to the complete article shown in Fig. 1, consisting of the hook *a*, somewhat rounded on the surface of section *b* by being struck up slightly curved at *c*, and the prongs *d* bent from the portion *e*, substantially at right angle therewith, and the central section of portion *e* is bent to form one of the prongs at or near the back of the hook.

Figure 5:

In fastening the lacing-hook in position, its prongs are passed through the material to which it is attached, and bent over and clinched on the opposite side, as shown in Figs. 3 and 5.

The economy in material and construction of this lacing-hook is too manifest for comment, and therein lies its advantages over articles for similar use on the market. It is adapted for any of the purposes to which such hooks can be applied, its principal use being as a fastening for boots and shoes.

Figure 6:

In Fig. 6 I show a modification of my invention, in which the hook and prongs, instead of being "struck up" from a flat blank, are shaped from wire without departing from the spirit of my invention, which, broadly, is a hook provided with clinching-prongs.

I claim—

A lacing-hook blank struck up from sheet metal, one end of which constitutes the hook portion, the opposite end having two outer fastening-prongs of nearly equal length, and an intermediate shorter prong, all substantially as and for the purpose set forth.

EDWD. MAYNZ.

Witnesses:
 F. F. RAYMOND, 2d,
 A. J. OETTINGER.